US012276385B2

(12) United States Patent
Drüppel et al.

(10) Patent No.: US 12,276,385 B2
(45) Date of Patent: Apr. 15, 2025

(54) LAMP FOR VEHICLES

(71) Applicant: Hella GmbH & Co. KGaA, Lippstadt (DE)

(72) Inventors: Mathias Drüppel, Lippstadt (DE); Bernd Fischer, Altenbeken (DE); Marc Kaup, Paderborn (DE); Benjamin Willeke, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/608,074

(22) Filed: Mar. 18, 2024

(65) Prior Publication Data

US 2024/0218991 A1 Jul. 4, 2024

Related U.S. Application Data

(63) Continuation of application No. PCT/EP2022/074582, filed on May 9, 2022.

(30) Foreign Application Priority Data

Sep. 20, 2021 (DE) ..................... 10 2021 124 222.3

(51) Int. Cl.

| | |
|---|---|
| ***F21S 41/27*** | (2018.01) |
| ***F21S 41/143*** | (2018.01) |
| ***F21S 41/151*** | (2018.01) |
| ***F21S 41/40*** | (2018.01) |

(52) U.S. Cl.

CPC ............. *F21S 41/27* (2018.01); *F21S 41/143* (2018.01); *F21S 41/151* (2018.01); *F21S 41/40* (2018.01)

(58) Field of Classification Search

CPC .......... F21S 41/27; F21S 41/143; F21S 41/40; F21S 41/151

See application file for complete search history.

(56) References Cited

U.S. PATENT DOCUMENTS

| | | | | |
|---|---|---|---|---|
| 10,232,763 | B1 | 3/2019 | Eckstein et al. | |
| 2016/0265733 | A1* | 9/2016 | Bauer | F21S 41/16 |
| 2018/0283656 | A1* | 10/2018 | Gommans | F21V 11/06 |
| 2018/0335191 | A1* | 11/2018 | Stefanov | F21S 41/143 |
| 2019/0072252 | A1* | 3/2019 | Moser | F21S 41/68 |
| 2020/0103086 | A1* | 4/2020 | Zozgornik | F21S 41/143 |
| 2020/0217471 | A1* | 7/2020 | Moser | F21S 41/43 |
| 2020/0332977 | A1* | 10/2020 | Miedler | F21S 41/43 |
| 2021/0239290 | A1* | 8/2021 | Fischer | F21S 41/143 |

FOREIGN PATENT DOCUMENTS

| | | | |
|---|---|---|---|
| DE | 10205779 | A1 | 10/2003 |
| DE | 102012008833 | A1 | 11/2012 |
| DE | 102018107213 | A1 | 10/2019 |
| DE | 102020213531 | A1 | 5/2021 |
| DE | 102020102226 | A1 | 8/2021 |
| EP | 2037167 | A2 | 3/2009 |
| EP | 3594059 | A1 | 1/2020 |
| JP | 2020061231 | A | 4/2020 |
| JP | 2020061232 | A | 4/2020 |
| WO | 2015058227 | A1 | 4/2015 |

* cited by examiner

*Primary Examiner* — Christopher E Dunay

(74) *Attorney, Agent, or Firm* — Husch Blackwell LLP

(57) ABSTRACT

A lamp for vehicles is provided with a number of light modules that are offset or tilted in relation to one another, such that light distributions of the light modules can be overlapped to obtain a homogenous overall light distribution.

19 Claims, 5 Drawing Sheets

LAMP FOR VEHICLES

CROSS REFERENCE

This application claims priority to PCT Application No. PCT/EP2022/074582, filed Sep. 5, 2022, which itself claims priority to German Application No. 10 2021 124222.3, filed Sep. 20, 2021, the entireties of both of which are hereby incorporated by reference.

FIELD OF THE INVENTION

The invention relates to a lamp for vehicles that has a number of light modules, which contain a light source unit that has a number light sources in a row running in a primary direction, and/or in a column, that emit light, a screen placed in front of the light source unit in the main beam direction, with openings spaced apart from one another in the primary direction, each of which is dedicated to the light sources, a collimator in front of the screen in the main beam direction that aligns the light emitted from the light source unit, a diffusion lens placed in front of the collimator in the main beam direction that spreads out the light pixels passing through the openings in the screen horizontally and vertically to obtain light spots forming a light distribution, wherein the diffusion lens has a first optical structure on the light-entry side, facing the collimator, which has a number of micro-optical elements, and/or a second optical structure on the light-emitting side, facing away from the collimator, which has a number of micro-optical elements, to deflect the light vertically and/or horizontally.

BACKGROUND OF THE INVENTION

DE 10 2018 107 213 A1 discloses a lamp for vehicles that has a light source unit containing numerous light sources, a screen, numerous collimators, and focusing optics. The screen has numerous openings that are each dedicated to the light sources in the light source unit and the collimators. The screen is placed on the light-entry side of the collimators that are integrally connected to one another. The openings, and therefore the light sources, each have a single dedicated collimator, resulting in a relatively large number of components.

U.S. Pat. No. 10,232,763 B1 discloses a lamp for vehicles that has a number of light sources, a collimator, and focusing optics, in which a screen with openings is integrated. If the light distribution is to be altered, e.g. to generate light in front of the vehicle, a front section of the focusing optics in the main beam direction can be moved laterally toward a rear section. If the lamp contains numerous light modules, they can be tilted toward one another, such that light distributions generated by the light modules overlap. This results in a homogenous and bright light distribution.

BRIEF SUMMARY OF THE INVENTION

The object of the present invention is to further develop a lamp for vehicles that is inexpensive and can generate a predefined light distribution with simple means.

To solve this problem, numerous light modules are spatially offset to one another, with parallel primary directions of the screens for the first and second light modules, and the second light module is offset to the first light module in just one first direction, which is perpendicular to a plane defined by the primary direction and the main beam direction, or the second light module is offset to the first light module in the first direction and in the primary direction, such that the light modules are offset to one another in the primary direction, such that a row of light pixels from a first light module and a row of light pixels from a second light module are projected into a row of light spots forming a first light distribution generated by the first light module, or a second light distribution generated by the second light module, which are offset to one another on the measurement projection screen in the primary direction, in that the first and second light module, or the components composed of the light source unit, the screen, and the collimator in the first and second light modules, are pivoted about a tilting axis that is parallel to the primary direction so differently that the rows of light spots in the first light distribution and second light distribution that are offset to one another in the primary direction on the measurement projection screen overlap in the primary direction.

The particular advantage of the invention is that a light distribution can be generated inexpensively and in a space-saving manner. A light source unit and a screen interact such that homogenous light is emitted through the openings in the screen. The openings in the screen basically form the surface through which the light sources effectively emit light. The openings, or the spaces between the openings, therefore define the distance between the light-emitting surfaces of the light sources, or the light pixels. According to the invention, numerous light modules, each of which has a screen with numerous openings arranged in rows and/or columns, a collimator, and a diffusion lens, are offset spatially to one another. There are also a row and/or column of openings for the respective light modules that are offset to one another in a primary direction in relation to a reference, such that the respective openings (light pixels) projected as light spots in the light distribution are arranged in accordance with the spacing to the reference. By also tilting the light modules, the diagonally or vertically offset light sources for the light distributions generated by the light modules can be brought into the same row or column. Advantageously, a single row of light spots can be formed therewith when numerous light modules that are spatially separated vertically or diagonally from one another, form numerous identical rows of light spots (light spot strips), in which the light spots from the respective light modules overlap in the direction in which the light spot rows (light spot strips) extend. If the light modules have a screen with a single row (strip) of openings, the light pixels from these opening strips are projected onto a single horizontal light spot strip, in which two light spots from a single light module that are spaced apart from one another overlap with light spots from the other light module, such that an otherwise occurring gap can be filled. Advantageously, this makes it possible to generate a bright light distribution in a simple manner through the use of numerous, preferably identical light modules. A non-blinding high beam light distribution can thus be generated with numerous light sources that can preferably be controlled individually.

According to a preferred embodiment, the numerous light modules are identical, and the overlapping of the light distributions from the light modules simply through offsetting and/or tilting them results in a homogenous overall light distribution. The light distributions of the light modules are all identical.

According to one development of the invention, the openings in the screen are smaller than light-emitting surface of the light source in the light source unit dedicated thereto. Tolerances in the adjustment of the light sources to the screen can be compensated for by this.

According to one development of the invention, a first optical structure on the light-entry side of the diffusion lens has prism elements and arced elements that alternate in the direction transverse to the primary direction. This advantageously deflects or diffuses the light to different extents at the different sides of a primary axis defined by the primary direction. By way of example, an asymmetrical upward and downward diffusion of the light can be obtained with the prism and arced elements.

According to one development of the invention, a second micro-optical structure on the light-emitting side of the diffusion lens forms partial cylinders, which have a cylinder axis that is transverse to the primary direction and to the main beam direction. This micro-optical structure preferably diffuses the light horizontally.

According to one development of the invention, the diffusion lens is designed to cover all of the light modules in the main beam direction of the collimator. The diffusion lens is therefore a part of numerous light modules. To reduce the number of components, the diffusion lens can also function as a cover panel for a headlamp housing.

According to one embodiment of the invention, the diffusion lens is tilted in a plane defined by the main beam direction and a direction perpendicular thereto and to the primary direction. This tilted design is of particular advantage if a middle light module in an odd number of light modules serves as the reference. By tilting the diffusion lens, the light modules above the reference light module can be tilted in the opposite direction of the light modules below the reference light module in a simple manner. The light module is thus aligned using the middle light module as the reference.

According to another embodiment of the invention, an upper and lower light module forms the reference for the other light modules. The light modules are further pivoted about a predefined tilting angle starting from the reference module, such that the tilting angle increases in relation to the reference with each successive light module. As the tilting angle increases, so does the offset of the opening strip, such that the light spots from the light modules can be projected onto a single light spot strip.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
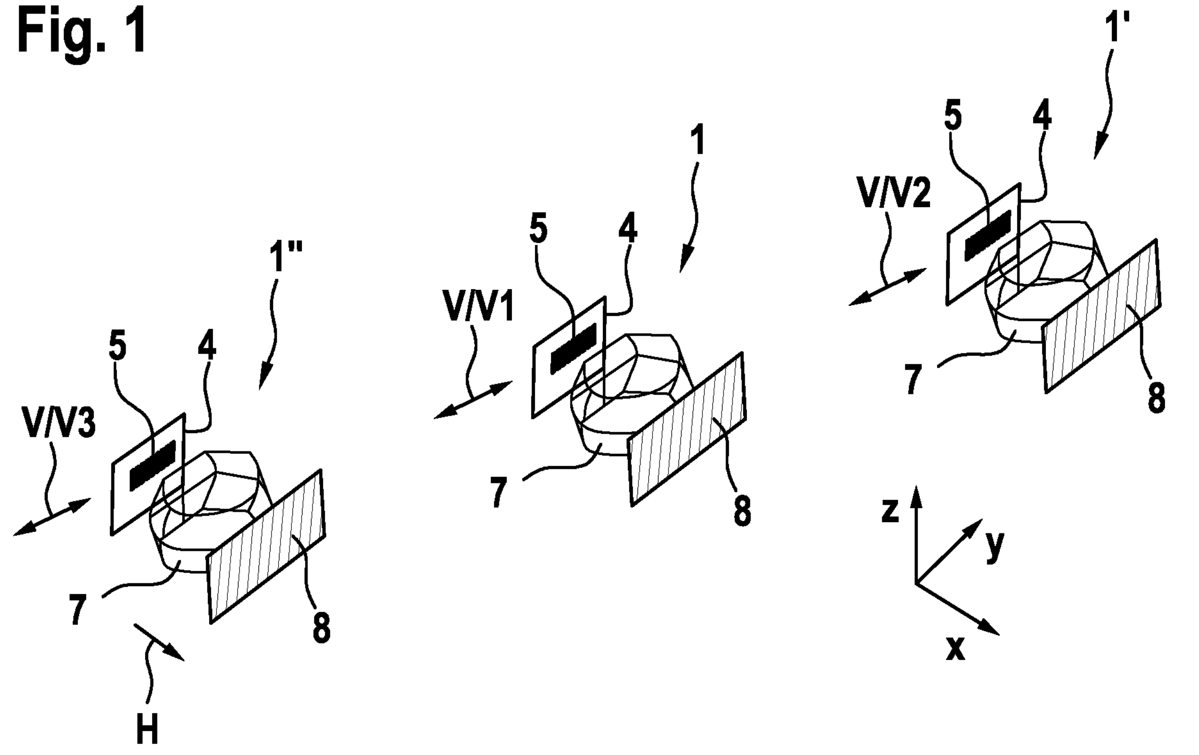
FIG. 1 shows a perspective illustration of a lamp that has three light modules offset laterally and longitudinally to one another.

A lamp for vehicles can be used in particular for generating a high beam light distribution. An asymmetrical low beam light distribution and a light distribution for the area in front of the vehicle can also be generated by other light modules. If the individual light sources in the lamp can be controlled individually, it is possible to generate a high beam light distribution that does not blind oncoming traffic, or traffic in front of the vehicle.

The lamp for vehicles according to the invention is composed of numerous, preferably identical, light modules 1. There are three light modules 1, 1', 1" in the present exemplary embodiment.

The light modules 1, 1', 1", each have a light source unit 2 that contains numerous light sources 3. The light sources 3 can be arranged in rows and/or columns on a substrate (printed circuit board) to form a matrix. There is just one row (strip) of light sources 3 in the light source unit 2 in the present exemplary embodiment, in which the light sources 3 are spaced apart along the primary direction V. The light sources 3 are each formed by LED chips.

The light modules 1, 1', 1" each have a screen 4 that has numerous openings 5. The openings 5 are each dedicated to the light sources 3, and placed in front of the respective light sources 3 in the main beam direction H. The openings 5 are offset to the light sources 3 in the main beam direction H, and extend along the primary direction V, which is aligned with the horizontal y-axis. The row of openings 5 and row of light sources 3 are therefore parallel. The openings 5 are smaller than the light-emitting surfaces on the light sources 3. This makes it possible to compensate for tolerances in the placement of the light sources 3 in relation to one another. Even if the light sources 3 are not perfectly aligned to a middle axis of the respective openings 5, a homogenous light is still emitted through these openings 5. The openings 5 basically form light pixels 16 (light-emitting surfaces) of the same size. By way of example, the size of the openings 5 in the screen 4 is such that the distance between opposing rims 6 is 0.3 mm smaller than between the rims of the light-emitting surfaces on the light sources 3. Tolerances in the LED light sources of ±0.15 mm can be compensated for in this manner.

The screen 4 is made of sheet metal with a thickness of 0.2 mm, for example. It can have a non-reflective surface. The screen 4 is connected directly to the light source unit 2, with the light sources 3 placed behind the respective openings 5 in the main beam direction H. The light sources 3 preferably do not come in contact with the screen 4.

The light modules 1, 1', 1" also have a collimator 7 placed in front of the screen 4 at a spacing a thereto in the main beam direction H. The collimator 7 is designed and configured to align the light passing through the openings 5. The collimator 7 is a free-form lens. The collimator 7 is preferably a biconvex lens.

Figure 7:
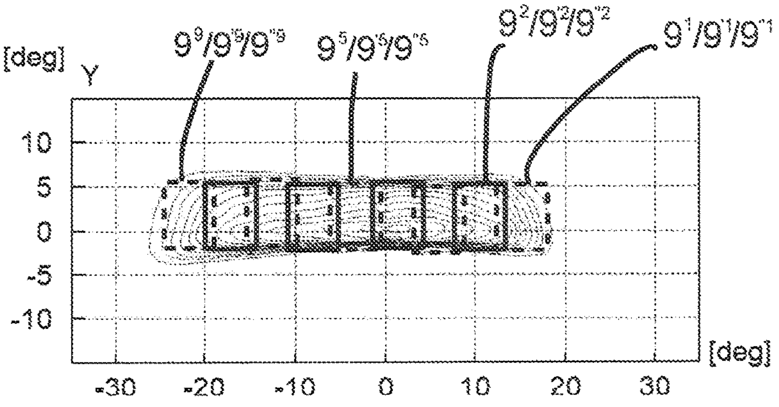
FIG. 7 shows an overall light distribution of the light distributions generated by the three light modules.

A diffusion lens 8 is placed in front of the collimator 7 in the main beam direction for horizontally and vertically diffusing the light pixels defined by the size of the openings 5 in the screen 4, to obtain light spots 9, 9', 9" in a light distribution. The light distributions generated by the light modules 1, 1', 1" overlap to obtain an overall light distribution 10, which is shown in FIG. 7. The light pixels 16 that are spaced apart along the horizontal y-axis, which are the same size as the respective openings 5, are projected as light spots 9, 9', 9", each of which runs in the same direction along the y-axis.

The diffusion lens 8 has a first optical structure 11 on the light-entry surface, which has numerous micro-optics 12, 12', and a second optical structure 13 with numerous micro-optics 14. The first optical structure 11 diffuses or spreads out the entering light vertically, i.e. upward and downward along the z-axis. The first optical structure 11 contains prism elements forming the micro-optics elements 12, and arced elements forming the micro-optics elements 12', which alternate in the direction transverse to the primary direction V. The arced elements 12' are directly adjacent to the prism elements 12 in the primary direction V. The prism elements 12 are directly adjacent to the arced elements 12' in the primary direction V. The cross section of the first optical structure forms a sawtooth shape, in which the end surfaces of the prism elements 12 are rounded by the arced elements 12'. The arced elements 12' connect the peaks 15 protruding from the base 19 of the light-entry surface on the diffusion lens 8 to the base 19 thereof, such that the prism elements 12 are offset to one another along the z-axis by the width of the arced elements 12'.

The maximum height d (distance from the peak 12 to the base of the light-entry surface) of the prism elements 12 preferably decreases toward the axis of the diffusion lens 8.

The first optical structure 11 results in a relatively small vertical diffusion of the light in the lower part of the overall light distribution 10, such that it has an optimal transition to the light distribution illuminating the area in front of the vehicle. The upward vertical diffusion is greater, to improve the visibility of objects.

The second optical structure 13 contains micro-optics elements 14 that form partial cylinders, which have a cylinder axis that is transverse to the primary direction V and to the main beam direction H. The partial cylinder micro-optics elements 14 are therefore parallel to one another along the z-axis (vertically). The partial cylinder micro-optics elements 14 are directly adjacent to one another. The second optical structure 14 diffuses the light horizontally, thus contributing to a homogenous overall light distribution.

The collimator 7 and diffusion lens 8 are preferably made of glass or plastic, e.g. PMMA.

The size of the diffusion lens 8 can be 20×40 mm.

Figure 2:
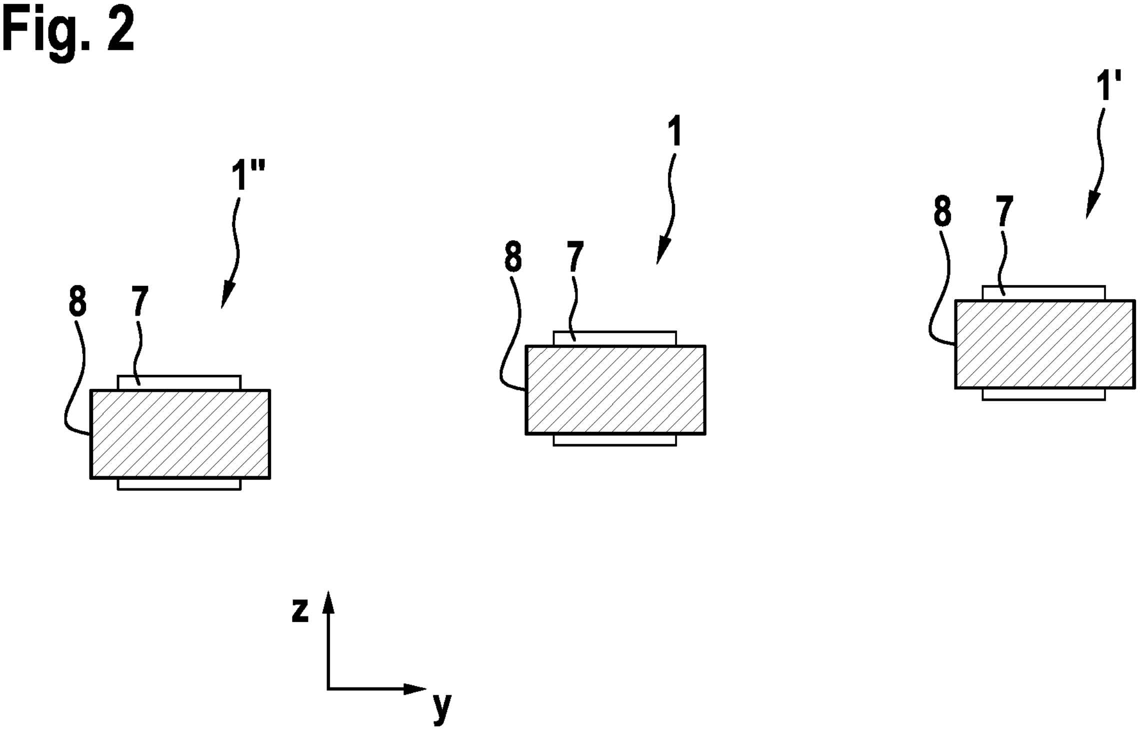
FIG. 2 shows a front view of the light module shown in FIG. 1.
Figure 3:
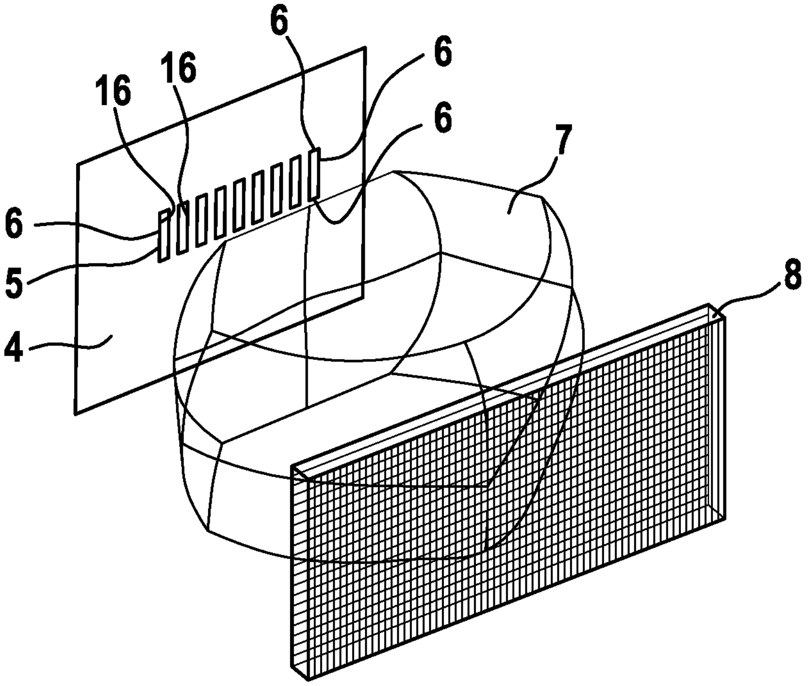
FIG. 3 shows an enlarged front view of a light module.
Figure 4:
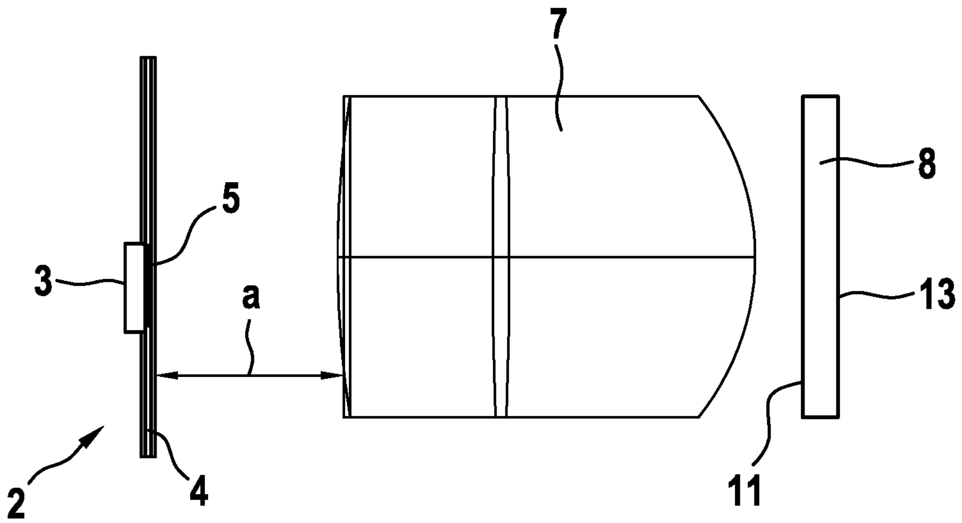
FIG. 4 shows a side view of the light module.
Figure 5:
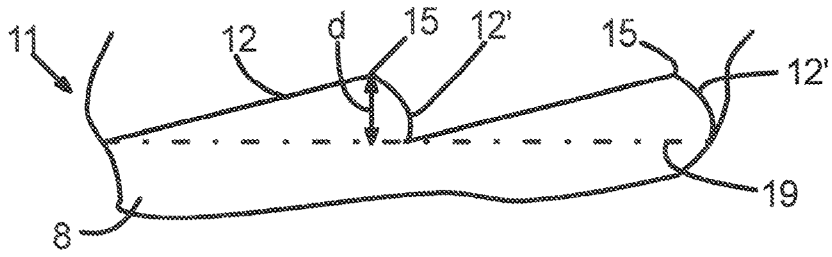
FIG. 5 shows an enlarged illustration of a diffusion lens for the light module, with an enlarged illustration of an optical structure on the entry side.
Figure 6:
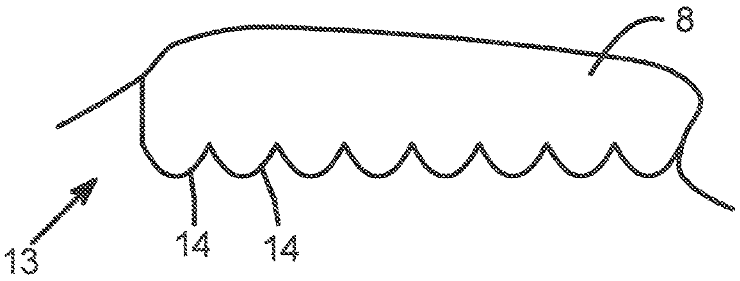
FIG. 6 shows an enlarged illustration of a diffusion lens for the light modules, with an enlarged illustration of an optical structure on the light emission side.

As can be seen in FIG. 2, the light modules 1, 1', 1" are offset along the y-axis (horizontally) and z-axis (vertically), in the housing for the headlamp. As can be seen in FIG. 1, the light modules 1, 1', 1" are also offset to one another along the main beam direction (x-axis), such that they can be accommodated in a tapered headlamp housing. The light modules 1, 1', 1" are preferably identical.

The light modules 1, 1', 1" are oriented in the main beam direction, and the primary direction V2 of an upper light module 1' is parallel the primary direction V1 of the middle light module 1. The primary direction V3 of the lower light module 1" is also parallel to the primary direction V1 of the middle light module 1, and the primary direction V2 of the upper light module 1'.

Figure 8:
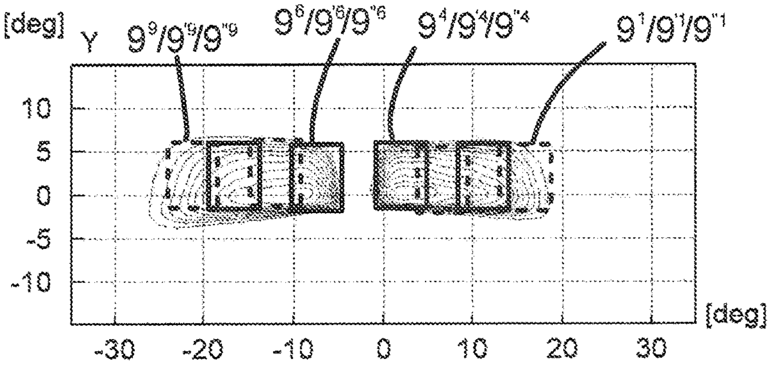
FIG. 8 shows an overall light distribution with light sources switched off in each case at the same locations in the light source strips.
Figure 9A:
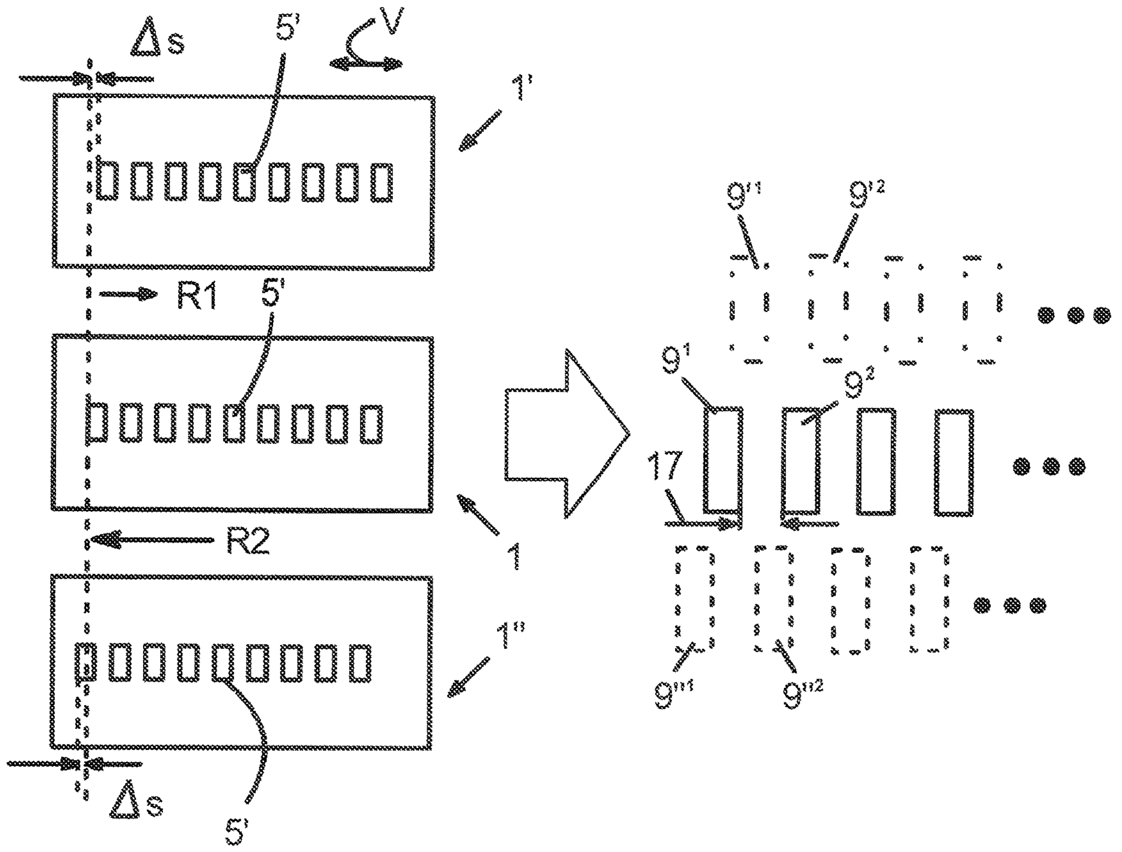
FIG. 9*a* shows a schematic illustration of the light modules, which have not been tilted.
Figure 9B:
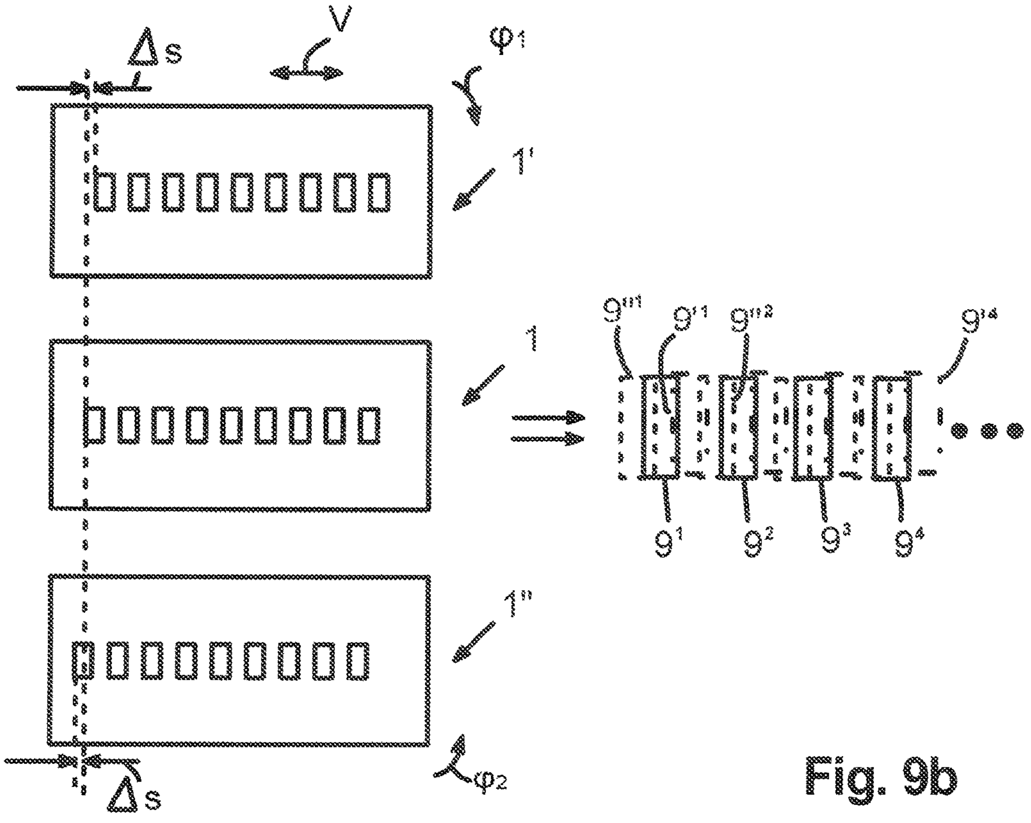
FIG. 9*b* shows a schematic illustration of the light modules, which have been tilted.

As can be seen in FIG. 9*a*, the light modules 1, 1', 1" are offset to one another along the primary direction V. In relation to the middle light module 1, the row of openings 5 in the upper light module 1' is offset to the row of openings 5 in the middle light module 1 by Δs in a first direction R1 and the row of openings 5 in the lower light module 1" is offset to the row of openings 5 in the middle light module 1 by Δs in an opposite, second direction R2. This means that the offset directions R1 and R2 are the same as the primary direction V. The offset Δs is large enough that the light spots 9' projected by the upper light module 1' and the light spots 9" projected by the lower light module 1" cover any gaps 17 between the adjacent light spots 9 projected by the middle light module 1. A row of light spots 9 from the middle light module 1', a row of light spots 9' from the upper light module 1', and a row of light spots 9" from the lower light module 1" are shown in FIG. 9*a* when the rows of openings 5 in the light modules 1, 1', 1" are only offset to one another in the directions R1 and R2. The rows of light spots 9, 9', 9" are arranged vertically along the z-axis, but offset to one another along the y-axis (horizontally). When the strips of light spots 9' and the lower light spots 9" are projected into the plane of the light spots 9 from the middle light module 1', the gaps 17 can be filled, in which case the gaps 17 between adjacent light spots 9 are filled by overlapping an upper light spot 9' and a lower light spot 9" therewith. To ensure that this overlapping of the light spots 9, 9', 9" takes place, as shown in FIG. 9*b*, the upper light module 1' is pivoted downward over a tilting angle φ1 in relation to the middle light module 1', while the lower light module 1" is pivoted upward over the same tilting angle @2 in relation to the middle light module 1'. The tilting axis 18 is parallel to the primary direction V, i.e. horizontal. This results in an overlapping of the light spots 9, 9', 9" from the light module in the primary direction V. Consequently, the gaps 17 between the first light spot $9^1$ and the second light spot $9^2$ from the middle light module 1 are filled by the first light spot $9'^1$ from the upper light module 1' and the second light spot $9''^2$ from the lower light module 1". The same is the case with the gaps 17 between the other adjacent light spots $9^2$ to $9^9$ in the light distribution generated by the middle light module 1'. FIG. 8 clearly shows that the overall light distribution is obtained by merely overlapping a single row of light modules 1, 1', 1".

The light modules 1, 1', 1" are each tilted over a horizontal tilting axis, running along the y-axis. The tilting angles φ1, φ2 of the lower and upper light modules 1', 1" can be 0.2°, for example, to which they are tilted in opposite directions.

To avoid blinding other road users, the middle light sources 3 corresponding to the middle openings 5' can be switched off. In this case, a middle section of the overall light distribution 10 is darkened, see FIG. 8.

Figure 10:
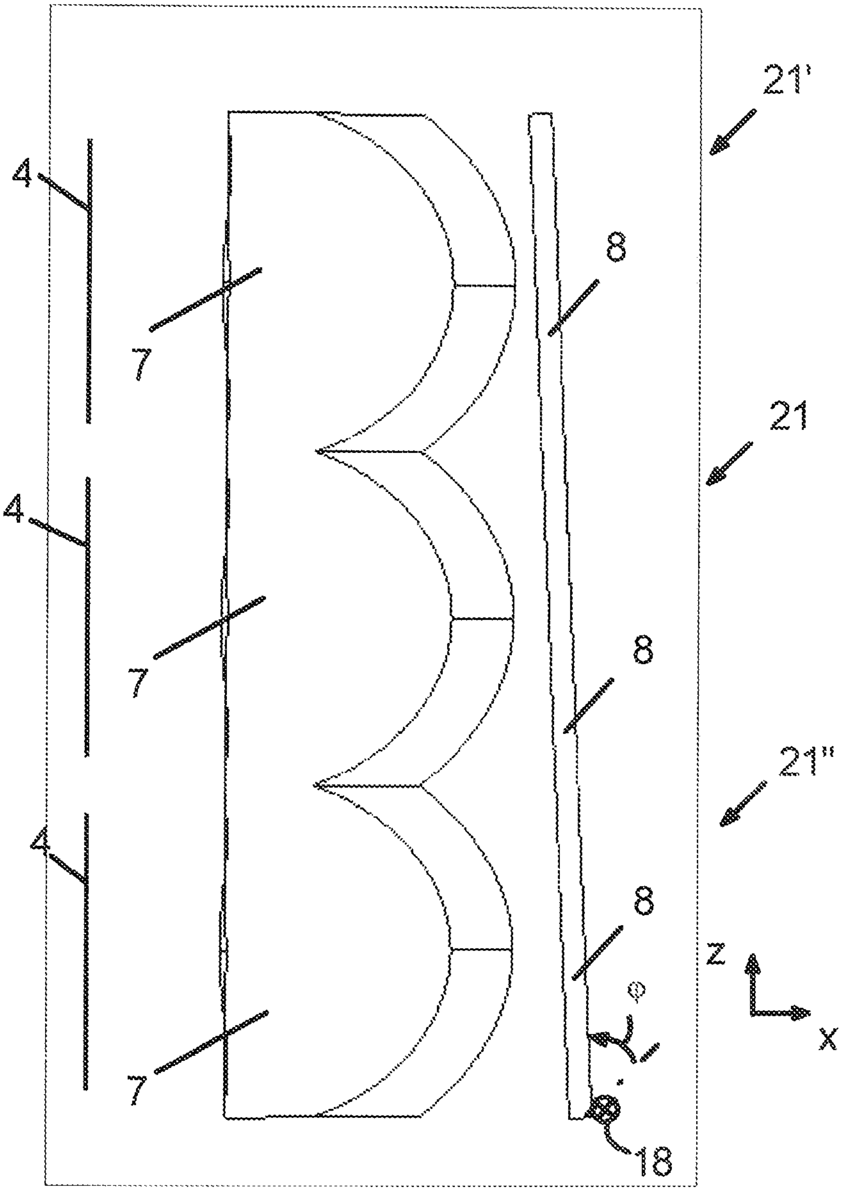
FIG. 10 shows a side view of an alternative lamp according to the invention, with integrally connected collimators.

According to a second embodiment of the invention shown in FIG. 10, there are three light modules 21, 21', 21", which differ from the preceding light modules 1, 1', 1" in that the light modules 21, 21', 21" are only spatially offset to one another in the direction transverse to the primary axis, i.e. along the z-axis. Furthermore, the light modules 21, 21', 21" are directly adjacent to one another, and the collimators 7 and the diffusion lens form an integral component.

Identical components and component functions are given the same reference symbols.

Unlike in the first embodiment, the light modules 21, 21', 21" are not all tilted about the tilting axis 18. The tilting only takes place in relation to the diffusion lens 8 with respect to the other components in the light module, specifically the collimator 7, the screen 4, and the light source unit 2. As can be seen in FIG. 10, the diffusion lens 8 is tilted in relation to the collimator 7, starting at the lower edge thereof, over the tilting angle q. The lower light module 21' serves as the reference for the other light modules 21 and 21". Consequently, the light spots 9, 9', 9" generated by the respective light modules 21, 21', 21" can be placed in the same horizontal plane, such that they overlap.

It is clear that the diffusion lens 8 forms a plate. The diffusion lens 8 covers the collimators for the light modules 21, 21', 21" in the main beam direction H.

In the present exemplary embodiments, the prism elements 12 rise from the base 19 of the light-entry surface at angles ranging from 3° to 10°. This range is preferably from 4° to 6°, in particular 5°. If the prism angle is 5°, this results in a vertical diffusion of the light over 5° as well.

LIST OF REFERENCE SYMBOLS

1, 1', 1" light module
2 light source unit
3 light source
4 screen
5, 5' openings
6 rim
7 collimator
8 diffusion lens
9, 9', 9" light spots
10 light distribution
11 first optical structure
12, 12' prism elements/arced elements
13 second optical structure
14 micro-optics elements
15 peak
16 first light pixel
17 gaps
18 tilting axis
19 base
21, 21', 21" light module
H main beam direction
a spacing
V, V1, V2, V3 primary direction
Δs offset
φ1, φ2 tilting angle
R1, R2 offset directions

We claim:

1. A lamp for vehicles, comprising:

two or more light modules, each light module including:

a light source unit that has a number of light sources in a row running in a primary direction (V) and/or in a column, which emit light;

a screen placed in front of the light source unit in a main beam direction (H), with openings spaced apart from one another in the primary direction (V) and positioned to align with the light sources;

a collimator placed in front of the screen in the main beam direction (H), which aligns the light emitted from the light source unit; and a diffusion lens placed in front of the collimator in the main beam direction (H) that diffuses the light passing through the openings in the screen horizontally and vertically to obtain light spots forming a light distribution, wherein the diffusion lens has a first optical structure on the light-entry side, facing the collimator, which has a number of micro-optical elements, and/or a second optical structure on the light-emitting side, facing away from the collimator, which has a number of micro-optical elements, to deflect the light vertically and/or horizontally, wherein the two or more light modules are spatially offset to one another, wherein either:

a first light module and a second light module of the two or more light modules are parallel to one another along the primary direction of the screen, and wherein the second light module is offset to the first light module in only a first direction, which is perpendicular to a plane defined by the primary direction (V) and the main beam direction (H), or the second light module is offset to the first light module in the first direction and in the primary direction (V), and the light modules are offset to one another in the primary direction (V), such that a row of light pixels from a first light module, and a row of light pixels from a second light module are projected into a row of light spots forming a first light distribution generated by the first light module, or a second light distribution generated by the second light module, which are offset to one another along the primary direction on a measurement projection screen, and wherein the first and second light module, or the components composed of the light source unit, the screen, and the collimator in the first and second light modules, are pivoted about a tilting axis that is parallel to the primary direction (V) so differently that the rows of light spots in the first light distribution and second light distribution that are offset to one another in the primary direction (V) on the measurement projection screen overlap in the primary direction (V).

2. The lamp according to claim 1, wherein the light modules are aligned such that the light distributions generated by the light modules are offset equally and in the primary direction (V) to one another.

3. The lamp according to claim 1, wherein the screen is spaced apart from the collimator.

4. The lamp according to claim 1, wherein the collimator and/or diffusion lens are made of glass or plastic.

5. The lamp according to claim 1, wherein the openings in the screen are smaller than light-emitting surfaces of the light sources in the light source unit dedicated thereto.

6. The lamp according to claim 1, wherein the openings in the screen extend longitudinally and/or laterally at least 0.2 mm less than the longitudinal and/or lateral extension of the light source.

7. The lamp according to claim 1, wherein the first optical structure on the light-entry side of the diffusion lens is formed by a first micro-optical element of the number of micro-optical elements, and wherein the first micro-optical element is composed of prism elements and arced elements that alternate in the direction transverse to the primary direction (V).

8. The lamp according to claim 7, wherein the arced elements are each formed on an end of the prism elements facing away from a base of the light-entry side.

9. The lamp according to claim 7, wherein the prism elements include a peak protruding away from the base of the light-entry side at uniform angles of 2°-8° to the base.

10. The lamp according to claim 9, wherein a distance (d) between the peaks of the prism elements and the base of the light-entry side decreases as they get closer to the axis.

11. The lamp according to claim 7, wherein the micro-optical elements in the second optical structure on the light-emitting side form partial cylinders with a cylinder axis that is transverse to the primary direction (V) and to the main beam direction (H).

12. The lamp according to claim 1, wherein the diffusion lens forms a plate.

13. The lamp according to claim 1, wherein the diffusion lens is large enough to cover the collimators for all of the light modules projecting in the main beam direction (H).

14. The lamp according to claim 1, wherein the diffusion lens is tilted in a plane defined by the main beam direction (H) and a direction perpendicular thereto and to the primary axis.

15. The lamp according to claim 1, wherein there is an odd number of light modules including a first light module, a second light module positioned above the first light module, and a third light module positioned below the first light module, and wherein the first light module forms a reference for the second light module and the third light module.

16. The lamp according to claim 1, wherein the light modules above a middle light module are tilted at an angle (φ) in a first direction, and the light modules below the middle light module are tilted at the same angle (φ) in the opposite direction.

17. The lamp according to claim 1, wherein the collimators and the light modules are integrally joined to one another.

18. The lamp according to claim 1, wherein there are at least three light modules including a reference light module located in a middle position relative to the remaining light modules, and wherein the tilting angle of the light modules increases as the distance to the reference light module in the direction transverse to the primary direction (V) increases.

19. The lamp according to claim 1, wherein the collimator receives light from a plurality of openings in the screen.

* * * * *